(12) United States Patent
Kwon et al.

(10) Patent No.: US 8,971,264 B2
(45) Date of Patent: Mar. 3, 2015

(54) COMMUNICATION METHOD OF TERMINALS AND ACCESS POINT FOR UPLINK MU-MIMO CHANNEL ACCESS

(75) Inventors: Ui Kun Kwon, Hwaseong-si (KR); Young Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 13/302,336

(22) Filed: Nov. 22, 2011

(65) Prior Publication Data

US 2012/0224540 A1 Sep. 6, 2012

(30) Foreign Application Priority Data

Mar. 3, 2011 (KR) .................. 10-2011-0018807

(51) Int. Cl.
| | | |
|---|---|---|
| *H04W 4/00* | (2009.01) | |
| *H04W 76/02* | (2009.01) | |
| *H04L 1/18* | (2006.01) | |
| H04W 74/08 | (2009.01) | |
| H04W 88/08 | (2009.01) | |
| H04L 1/16 | (2006.01) | |

(52) U.S. Cl.
CPC ............ *H04W 76/02* (2013.01); *H04L 1/1848* (2013.01); *H04L 1/1864* (2013.01); *H04L 1/1887* (2013.01); *H04W 74/0833* (2013.01); *H04W 88/08* (2013.01); *H04L 1/1685* (2013.01)
USPC .......................................... 370/329; 370/341

(58) Field of Classification Search
CPC . H04W 76/02; H04W 74/0833; H04W 88/08; H04L 1/887; H04L 1/1848; H04L 1/1864; H04L 1/1685

USPC .......... 370/310, 328, 329, 330, 338, 341, 346, 370/431–463
See application file for complete search history.

(56) References Cited

U.S. PATENT DOCUMENTS

| | | | |
|---|---|---|---|
| 7,352,718 B1 * | 4/2008 | Perahia et al. ............... 370/329 |
| 7,436,801 B1 | 10/2008 | Kanterakis | |
| 8,477,801 B2 * | 7/2013 | Sridhara et al. ............. 370/448 |
| 2003/0202501 A1 * | 10/2003 | Jang .............................. 370/346 |
| 2004/0214602 A1 * | 10/2004 | Aoyama ........................ 455/561 |
| 2005/0175027 A1 * | 8/2005 | Miller et al. .................. 370/458 |
| 2006/0073791 A1 * | 4/2006 | Senarath et al. ........... 455/67.13 |
| 2006/0154680 A1 * | 7/2006 | Kroth et al. ................... 455/515 |
| 2007/0047553 A1 * | 3/2007 | Matusz et al. ........... 370/395.42 |
| 2007/0177531 A1 * | 8/2007 | Rue ............................... 370/278 |

(Continued)

FOREIGN PATENT DOCUMENTS

KR 10-2010-0080520 7/2010

OTHER PUBLICATIONS

International Search Report issued Jun. 28, 2012, in counterpart International Application No. PCT/KR2011/008528 (3 pages, in English).

(Continued)

*Primary Examiner* — Ricky Ngo
*Assistant Examiner* — Kabir Jahangir
(74) *Attorney, Agent, or Firm* — NSIP Law

(57) ABSTRACT

Provided is a communication method of an access point and a plurality of terminals that are capable of enhancing a throughput of an overall network in a random access environment by enabling the access point to wait for additional terminals to transmit data through uplink communication during a predetermined waiting window.

17 Claims, 8 Drawing Sheets

(56) References Cited

U.S. PATENT DOCUMENTS

| | | | |
|---|---|---|---|
| 2009/0303918 A1* | 12/2009 | Ma et al. | 370/315 |
| 2009/0316811 A1* | 12/2009 | Maeda et al. | 375/260 |
| 2010/0067496 A1* | 3/2010 | Choi | 370/336 |
| 2010/0177757 A1* | 7/2010 | Kim et al. | 370/338 |
| 2010/0322166 A1 | 12/2010 | Sampath et al. | |
| 2011/0080889 A1* | 4/2011 | Kanterakis | 370/329 |
| 2011/0170535 A1* | 7/2011 | Wang et al. | 370/350 |
| 2011/0268054 A1* | 11/2011 | Abraham et al. | 370/329 |
| 2012/0039263 A1* | 2/2012 | Moberg et al. | 370/329 |

OTHER PUBLICATIONS

Extended European Search Report issued on Sep. 9, 2014, in counterpart European Application No. 11859872.1 (6 pages, in English).

* cited by examiner

COMMUNICATION METHOD OF TERMINALS AND ACCESS POINT FOR UPLINK MU-MIMO CHANNEL ACCESS

CROSS-REFERENCE TO RELATED APPLICATION(S)

This application claims the benefit under 35 U.S.C. §119 (a) of Korean Patent Application No. 10-2011-0018807, filed on Mar. 3, 2011, in the Korean Intellectual Property Office, the entire disclosure of which is incorporated herein by reference for all purposes.

BACKGROUND

1. Field

The following description relates to a communication technology of an access point and terminals for an uplink multi-user multiple-input multiple-output (MU-MIMO) channel access.

2. Description of Related Art

As the number of users and the various applications such as voice, video streaming, and the like continue to increase in a short range communication network, throughput in the network must be improved. To enhance throughput, a scheme of increasing a usage bandwidth of a channel may be used. However, a limited frequency resource may hinder the usage bandwidth of a channel.

An access point may simultaneously transmit signals to multiple terminals during down-link communication, for example, using a multi-user multiple-input multiple-output (MU-MIMO) technology. In this example, if a relatively accurate time synchronization is maintained, the access point may transmit frames to multiple terminals.

However, during up-link communication, multiple terminals located at different positions may independently transmit frames to the access point. Accordingly, it may be difficult for the access point to receive each of the respective frames transmitted by multiple terminals with relatively accurate time synchronization.

Accordingly, there is a desire for a communication method that is capable of enhancing throughput while multiple terminals transmit uplink data with relatively accurate time synchronization in a random access communication environment in which multiple terminals independently access a channel, such as a wireless local area network (LAN) system.

SUMMARY

In one general aspect, there is provided a communication method of an access point, the method including receiving a first request frame from a first terminal requesting an uplink communication, transmitting a first response frame to the first terminal indicating whether the first request frame is received, waiting for at least one second request frame to be received from at least one second terminal during a predetermined waiting window, the second request frame indicating a request for uplink communication from the at least one second terminal, and permitting uplink communication of the at least one second terminal based on whether the at least one second request frame is received.

The permitting may comprise permitting simultaneous uplink communication of the first terminal and the at least one second terminal when the at least one second request frame is received during the predetermined waiting window, and permitting uplink communication of the first terminal and not permitting uplink communication of the at least one second terminal when the at least one second request frame is not received during the predetermined waiting window.

The first request frame may include information about an amount of data to be transmitted by the first terminal, information about a size of a transmission of the data to be transmitted by the first terminal, and information about a number of streams included in the data.

The first response frame may include information about the predetermined waiting window.

The method may further comprise transmitting a second response frame including information about assigning a resource to at least one of the first terminal and the at least one second terminal, and receiving data from at least one of the first terminal and the at least one second terminal based on the assigned resource.

The second response frame may include information for synchronizing a transmission time of the first terminal and the at least one second terminal through the uplink, information about an amount of data that is to be transmitted through the uplink, information about a size of a transmission that is to be transmitted through the uplink, or information about a power back-off of at least one of the first terminal and the at least one second terminal.

The method may further comprise determining whether the request for uplink communication received from the first terminal and the at least one second terminal exceeds a maximum number of users or streams supportable by uplink communication, and transmitting the second response frame to the first terminal and the at least one second terminal before the predetermined waiting window terminates, based on a determination result.

The method may further comprise adjusting a length of the predetermined waiting window.

In another aspect, there is provided a communication method of a terminal, the method including transmitting a first request frame, requesting uplink communication, to an access point, receiving a first response frame indicating whether the first request frame is received, from the access point, waiting a predetermined waiting window based on information included in the first response frame, receiving a second response frame from the access point, and transmitting data to the access point based on information included in the second response frame transmitted from the access point.

The first response frame may include information about an amount of data to be transmitted by the terminal, information about a transmission size of the data to be transmitted by the terminal, and information about a number of streams included in the data.

The second response frame may include information about assigning a resource with respect to the terminal and at least one other terminal depending on whether the access point receives at least one second request frame, indicating whether uplink communication is requested from the at least other terminal during the predetermined waiting window.

The second response frame may include information for synchronizing a transmission time of data to be transmitted by the terminal and the at least one other terminal through the uplink, information about an amount of data that is to be transmitted through the uplink, information about a size of a transmission that is to be transmitted through the uplink, and/or information about a power back-off of at least one of the terminal and the at least one other terminal.

In another aspect, there is provided a communication method of a second terminal to transmit data to an access point after the access point has received a first request to uplink data from a first terminal, the method including receiving a first response frame from an access point, the first response frame being in response to first request frame received by the access point from a first terminal requesting uplink communication, transmitting a second request frame indicating whether uplink communication is requested by the second terminal during a predetermined waiting window indicated by information included in the first response frame, receiving, from the access point, a second response frame including information about assigning a resource for the second terminal in uplink communication, and transmitting data to the access point based on the second response frame.

The second response frame may include information about assigning a resource with respect to at least one of the first terminal and the second terminal.

The second response frame may include information for synchronizing a transmission time of the first terminal and the second terminal through the uplink, information about an amount of data that is to be transmitted through the uplink, information about a size of a transmission that is to be transmitted through the uplink, and/or information about a power back-off of at least one of the first terminal and the at least one second terminal.

In another aspect, there is provided a computer-readable storage medium having stored therein program instructions to cause a processor to execute a communication method of an access point, the method including receiving a first request frame from a first terminal requesting an uplink communication, transmitting a first response frame to the first terminal indicating whether the first request frame is received, waiting for at least one second request frame to be received from at least one second terminal during a predetermined waiting window, the second request frame indicating a request for uplink communication from the at least one second terminal, and permitting uplink communication of the at least one second terminal based on whether the at least one second request frame is received.

In another aspect, there is provided a terminal including a transmitter configured to transmit a request to an access point to request to uplink data to the access point, a receiver configured to receive a response from the access point, and a controller configured to synchronize an uplink time of the terminal with an uplink time of a second terminal based on information included in the response, wherein the transmitter is configured to transmit the uplink data at the synchronized uplink time.

The transmitter may be configured to transmit a first request to uplink data to the access point, the receiver may be configured to receive a first response indicating a predetermined waiting period that the terminal is to wait to uplink the uplink data and to receive a second response indicating the second terminal that is to uplink data, and the controller may be configured to synchronize the uplink time of the terminal with the uplink time of the second terminal based on information included in the second response.

The receiver may be configured to receive a first response frame from the access point indicating receipt of a first request to uplink data from the second terminal and a predetermined waiting period, the transmitter may be configured to transmit a second request frame requesting to uplink data to the access point, the receiver may be configured to receive a second response frame in response to the second request frame, and the controller may be configured to synchronize the uplink time of the terminal with the uplink time of the second terminal based on information included in the second response.

Other features and aspects will be apparent from the following detailed description, the drawings, and the claims.

Figure 1:
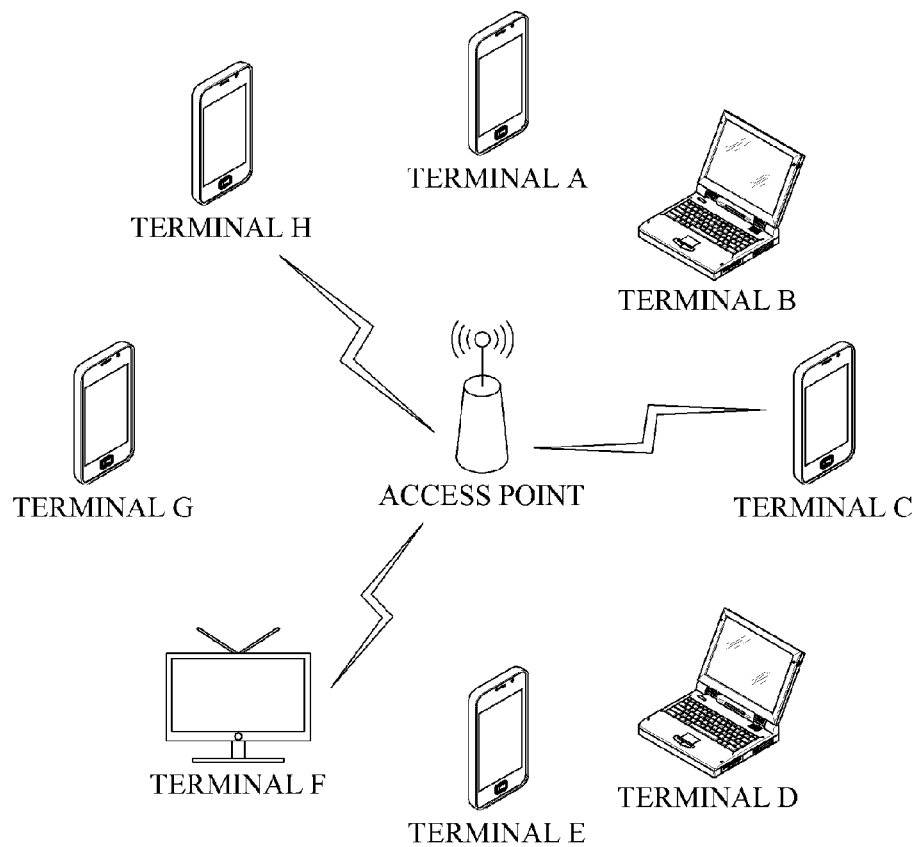
FIG. 1 is a diagram illustrating an example of a network of an access point and multiple terminals transmitting a signal using a multi-user multiple-input multiple-output (MU-MIMO) technology.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Hereinafter, it should be appreciated that each of a first terminal and a second terminal may correspond to a single-user multiple-input multiple-output (SU-MIMO) terminal or a multi-user multiple-input multiple-output (MU-MIMO) terminal.

A wireless local area network (LAN) may support an access point with multiple transmission and reception antennas. A wireless LAN technology is being increasingly applied to a terminal such as a mobile phone. However, the terminal may not include a large number of antennas due to a limit in the size of the terminal.

Even though the access point may have a larger number of transmission antennas, a maximum number of transmissible streams may be limited to a number of reception ends, for example, the number of antennas of a receiving terminal. As a result, the MU-MIMO communication technology may be used.

In the MU-MIMO communication technology, a transmission end that has at least one antenna, for example, the access point may transmit a signal to at least one reception end that has at least one antenna, for example, at least one terminal. Thus, the MU-MIMO communication technology may be referred to as a multi-user multiple antennas technology.

FIG. 1 illustrates an example of a network of an access point and multiple terminals transmitting a signal using an MU-MIMO technology.

Referring to FIG. 1, a single access point simultaneously exchanges signals with multiple terminals such as terminal C, terminal F, and terminal H.

In a random access communication environment such as a wireless LAN system in which multiple terminals independently access a channel, it may be difficult for the multiple terminals requesting uplink communication to be synchronized with each other. A wireless resource may be requested to be assigned to each terminal when there exists a limited number of streams that may be transmitted and received by each terminal.

In downlink communication, an access point may simultaneously transmit data to multiple terminals. In this example, even though each of the multiple terminals has a smaller number of antennas, the access point having a larger number of antennas may transmit a relatively large number of data streams simultaneously to the multiple terminals. An example of a data transmission in a downlink communication is described with reference to FIG. 2.

In uplink communication, in comparison to downlink communication, multiple terminals that have a smaller number of antennas may transmit data streams simultaneously to a single access point that has a larger number of reception antennas. An example of a data transmission in an uplink communication is described with reference to FIG. 3.

Figure 2:
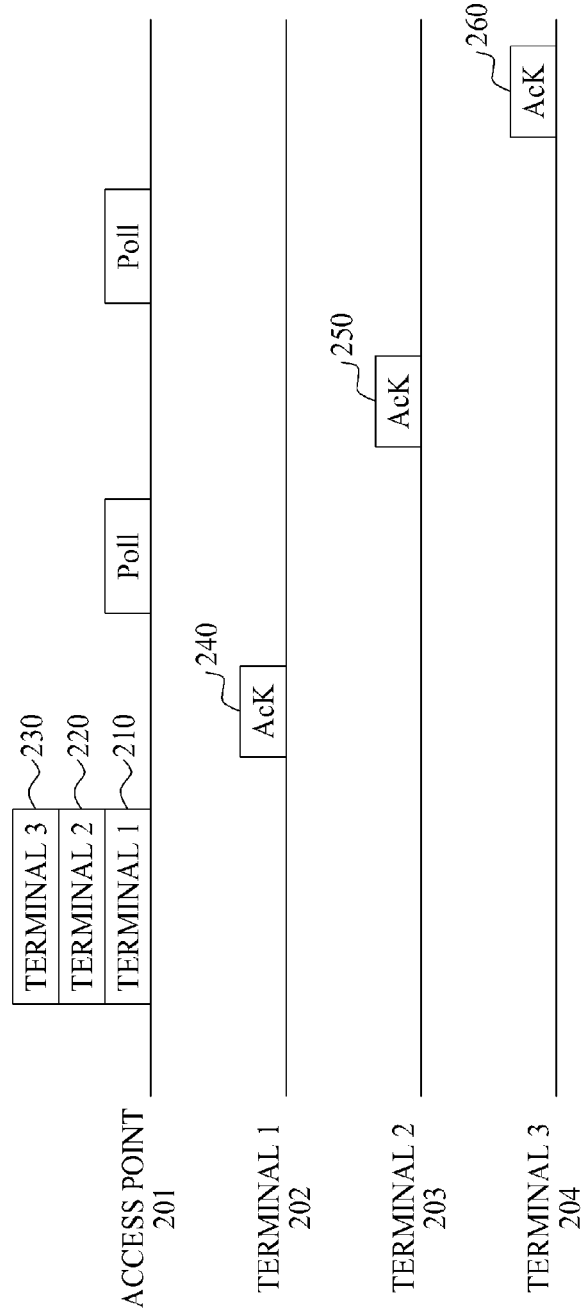
FIG. 2 is a diagram illustrating an example in which an access point simultaneously transmits data streams to multiple terminals in a downlink using a MU-MIMO technology.

FIG. 2 illustrates an example in which an access point 201 simultaneously transmits data streams to multiple terminals in a downlink using an MU-MIMO technology.

Referring to FIG. 2, the access point 201 may simultaneously transmit data streams (1) 210, (2) 220, and (3) 230 to three terminals such as terminal (1) 202, terminal (2) 203, and terminal (3) 204, respectively. Each of the terminals (1) 202, terminal (2) 203, and terminal (3) 204 may receive a stream such as data stream (1) 210, data stream (2) 220, and data stream (3) 230, respectively, which are simultaneously transmitted from the access point 201. In this example, the data stream (1) 210 corresponds to a data stream transmitted to the terminal (1) 202, the data stream (2) 220 corresponds to a data stream transmitted to the terminal (2) 203, and the data stream (3) 230 corresponds to a data stream transmitted to the terminal (3) 204.

Each of the terminals may decode a received data stream, and transmit acknowledgement (Ack) frames 240, 250, and 260 to the access point 201.

In uplink communication, in comparison to downlink communication, different terminals may simultaneously transmit data when the MU-MIMO technology is used. In this example, frames simultaneously transmitted from each terminal may be received by the access point 201 at the same time as an exact time synchronization.

However, each terminal may independently access a channel in the random access communication environment. Thus, it may be difficult to synchronize a time with respect to a frame transmitted to access point 201.

A magnitude of a signal received from each of multiple terminals may be appropriately aligned to enable the access point 201 to properly decode signals that are simultaneously received from the multiple terminals.

Figure 3:
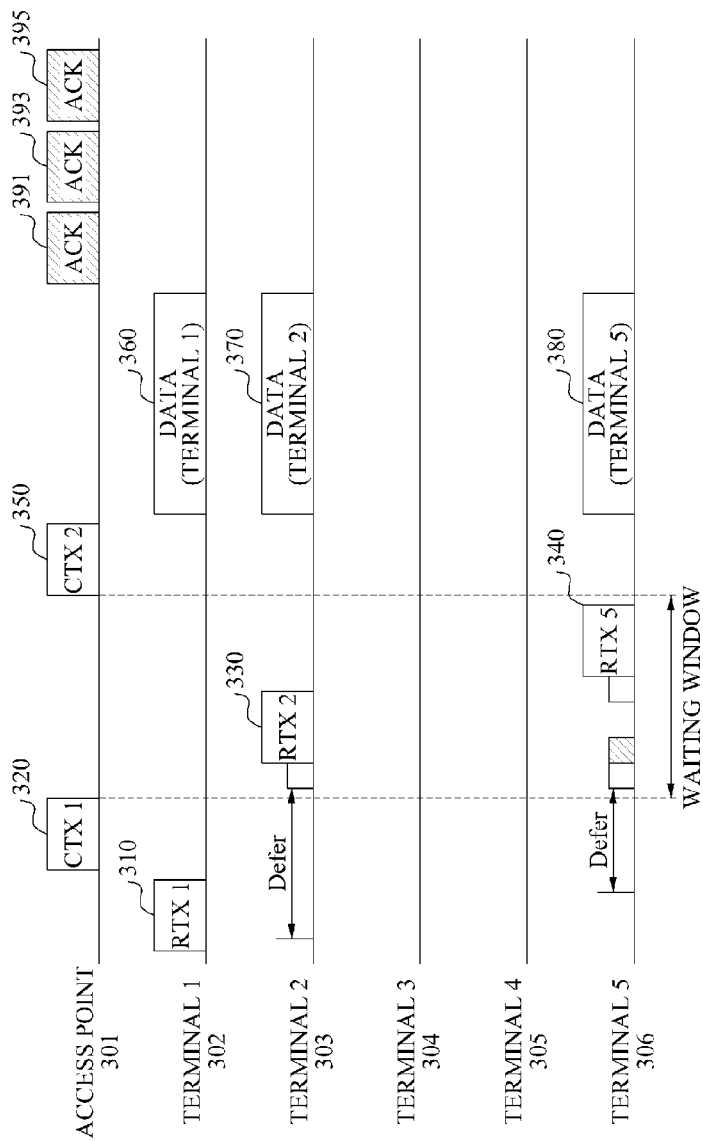
FIG. 3 is a diagram illustrating an example in which an access point receives data from terminals in an uplink using a MU-MIMO technology.

FIG. 3 illustrates an example in which an access point receives data from terminals in an uplink using an MU-MIMO technology. Hereinafter, data may include a concept of a data frame.

A terminal that is initially accessing a channel such as terminal (1) 302, may transmit a first request frame (RTX1) 310 requesting the access point to transmit data through uplink communication after a random back-off. The random back-off may be based on a carrier sense multiple access/collision avoidance (CSMA/CA) scheme.

In the CSMA/CA scheme, a terminal desiring to transmit data may check a channel state and may transmit data if a current channel state corresponds to an idle state. As another example, to reduce a probability that transmission frames collide, even though the channel is in the idle state, a frame may not be transmitted immediately but may be transmitted after a predetermined period of time during which a channel remains in the idle state. This is referred to as a channel back-off. For example, a channel back-off time during a transmission of each frame may be determined to be a predetermined value between "0" and a contention window.

A random back-off for a terminal that is initially accessing a channel, for example, terminal (1) 302, may indicate a channel back-off operation.

The first request frame (RTX1) 310 may include information about an amount of data to be transmitted by the terminal (1) 302, information about a transmission size of data to be transmitted by the terminal (1) 302, and/or information about a number of streams included in the data.

In the example of FIG. 3, the amount of data indicates a total amount of data to be transmitted to an access point 301 by the terminal (1) 302, and the transmission size of data indicates a length with respect to data to be transmitted to the access point 301 by the terminal (1) 302.

The access point 301 receiving the first request frame (RTX1) 310 may transmit a first response frame (CTX1) 320 indicating whether the access point 301 receives the first request frame (RTX1) 310, to terminal (1) 302, terminal (2) 303, terminal (3) 304, terminal (4) 305, and terminal (5) 306.

After the access point 301 transmits the first response frame (CTX1) 320, the access point 301 and the terminal (1) 302 may wait a predetermined period of time, that is, a waiting window to transmit/receive an additional transmission request with respect to uplink communication. The first response frame (CTX1) 320 may include information about a length of the waiting window.

Other than the terminal (1) 302 initially accessing the channel and transmitting the first request frame (RTX1) 310, terminals such as terminal (2) 303 and terminal (5) 306 transmit a second request frame (RTX2) 330 and a fifth request frame (RTX5) 340, respectively, requesting data transmission through uplink communication within the waiting window. In this example, the second request frame (RTX2) 330 and the fifth request frame (RTX5) 340 may be transmitted through a channel access based on the CSMA/CA scheme.

After a period of time the waiting window terminates. The access point 301 may transmit a second response frame (CTX2) 350 with respect to the received request frames (RTX 1) 310, (RTX 2) 330, and (RTX5) 340.

The second response frame (CTX2) 350 may correspond to the second request frame (RTX2) 330 and the fifth request frame (RTX5) 340. For example, the second response frame (CTX2) 350 may include information for time synchronization of data to be transmitted by a terminal to the access point 301 through the uplink, information about an amount of data that is to be transmitted through the uplink, and information about a transmission size that is to be transmitted through the uplink. For example, the information about an amount of data that is to be transmitted through the uplink and information about a size of a transmission to be transmitted through the uplink may be referred to as information about assigning a resource.

The information about an amount of data that is to be transmitted through the uplink may indicate a number of streams to be transmitted by the terminal to the access point through the uplink. The information about a size of a transmission that is to be transmitted through the uplink may indicate a length of a frame to be transmitted by the terminal to the access point.

The second response frame (CTX2) 350 may include information about a power back-off in each of terminal (1) 302, terminal (2) 303, terminal (3) 304, terminal (4) 305, and terminal (5) 306. The information about a power back-off may include information about adjusting a magnitude of a transmission signal by each terminal to adjust a magnitude of a frame received from the access point by each terminal.

If the access point 301 sufficiently receives a request for uplink communication before the waiting window terminates, the access point 301 may transmit the second response frame (CTX2) 350 to terminal (1) 302, terminal (2) 303, terminal (3) 304, terminal (4) 305, and terminal (5) 306 before the waiting window terminates.

An example in which the access point 301 sufficiently receives a request for uplink communication may correspond to a case in which a request for uplink communication received from each terminal by the access point exceeds a maximum number of users or streams supportable by uplink communication.

The terminal (1) 302, terminal (2) 303, and terminal (5) 306 receiving the second response frame (CTX2) 350 may transmit data 360, data 370, and data 380, respectively, to the access point 301 based on information about assigning a resource and information about a power back-off included in the second response frame (CTX2) 350.

For example, to enable data transmitted by each terminal to arrive at the access point 301 at the same time, each of terminal (1) 302, terminal (2) 303, and terminal (5) 306 may simultaneously transmit the data 360, the data 370, and the data 380, respectively, after a predetermined time interval, in response to termination of receiving the second response frame (CTX2) 350.

After a reception of data transmitted by each terminal terminates, the access point 301 may transmit acknowledgement (ACK) frames 391, 393, and 395 to each of terminal (1) 302, terminal (2) 303 and terminal (5) transmitting a data frame with respect to appropriately decoded data.

Figure 4:
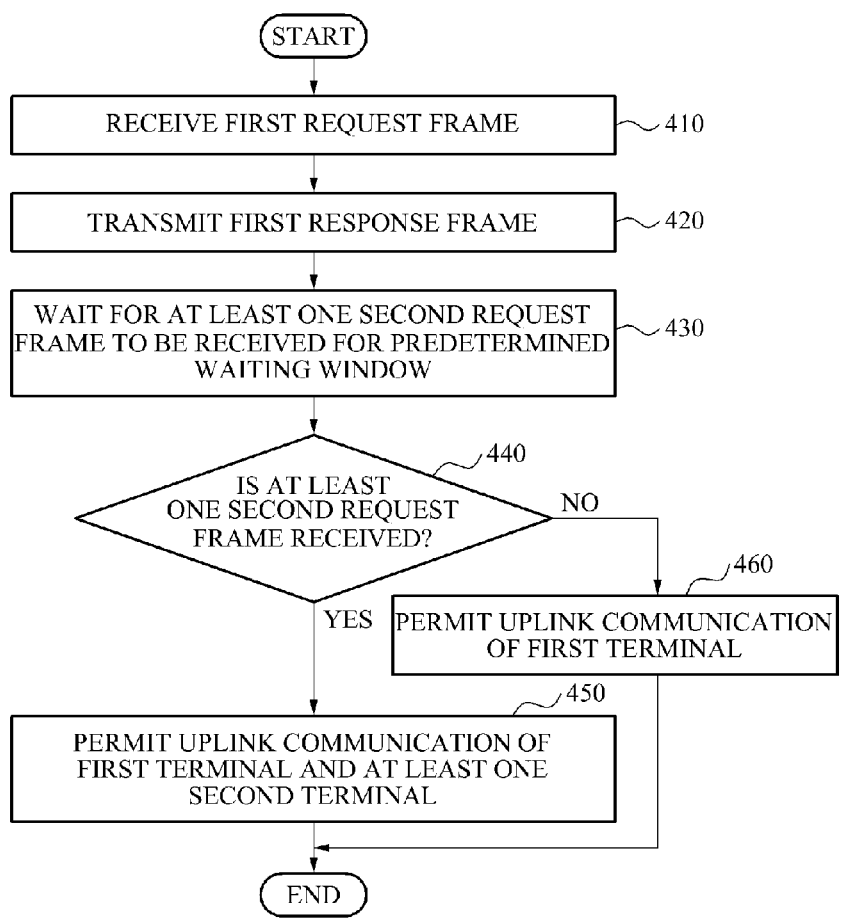
FIG. 4 is a flowchart illustrating an example of a communication method of an access point.

FIG. 4 illustrates an example of a communication method of an access point. FIG. 4 illustrates a communication method based on whether at least one second request frame is received by the access point.

In 410, the access point receives a first request frame from a first terminal requesting uplink communication. For example, the first terminal may be a terminal initially accessing a channel and requesting the access point to transmit data through uplink communication.

The first request frame may include information about an amount of data to be transmitted by the first terminal to the access point through uplink communication, information about a transmission size of the data to be transmitted by the first terminal, and information about a number of streams included in the data.

For example, the amount of data may correspond to an amount of total data to be transmitted by the first terminal to the access point, and the transmission size of the data may correspond to a length of a frame with respect to data to be transmitted to the access point by the first terminal.

In 420, the access point transmits a first response frame, to the first terminal, indicating whether the first request frame is received. For example, the first response frame may include information about a predetermined waiting window.

In 430, the access point waits for at least one second request frame, indicating whether uplink communication is requested from at least one second terminal, to be received during a predetermined waiting window.

The access point may permit uplink communication with respect to the first terminal immediately after transmitting the first response frame in response to the first request frame received from the first terminal. However, the access point may improve throughput of a network by waiting for a reception of a request for an additional uplink transmission from at least one other terminal, that is, at least a second terminal.

The access point may improve throughput by processing a request for data transmission from the first terminal with a request for data transmission from other terminals, when data transmission is requested from other terminals other than the first terminal during the predetermined waiting window.

In 440, the access point determines whether at least one second request frame is received from at least one second terminal.

In 450, if the at least one second request frame is received from the at least one second terminal, the access point permits uplink communication of the first terminal and the at least one second terminal. For example, the first terminal and the second terminal may be permitted to simultaneously perform the uplink communication.

In 460, if a request frame is not received from at least one second terminal during the predetermined waiting window, the access point may permit uplink communication of the first terminal.

The access point may receive or may not receive the at least one second request frame from the at least one second terminal in the waiting window. If a second terminal does not request uplink communication during a predetermined waiting window, the access point may transmit a second response frame including information about assigning a resource with respect to only the first terminal.

If the at least one second request frame is received from the at least one second terminal during the waiting window, the access point may transmit the second response frame including information about assigning a resource with respect to each of the first terminal and the at least one second terminal, to the first terminal and the at least one second terminal.

Figure 5:
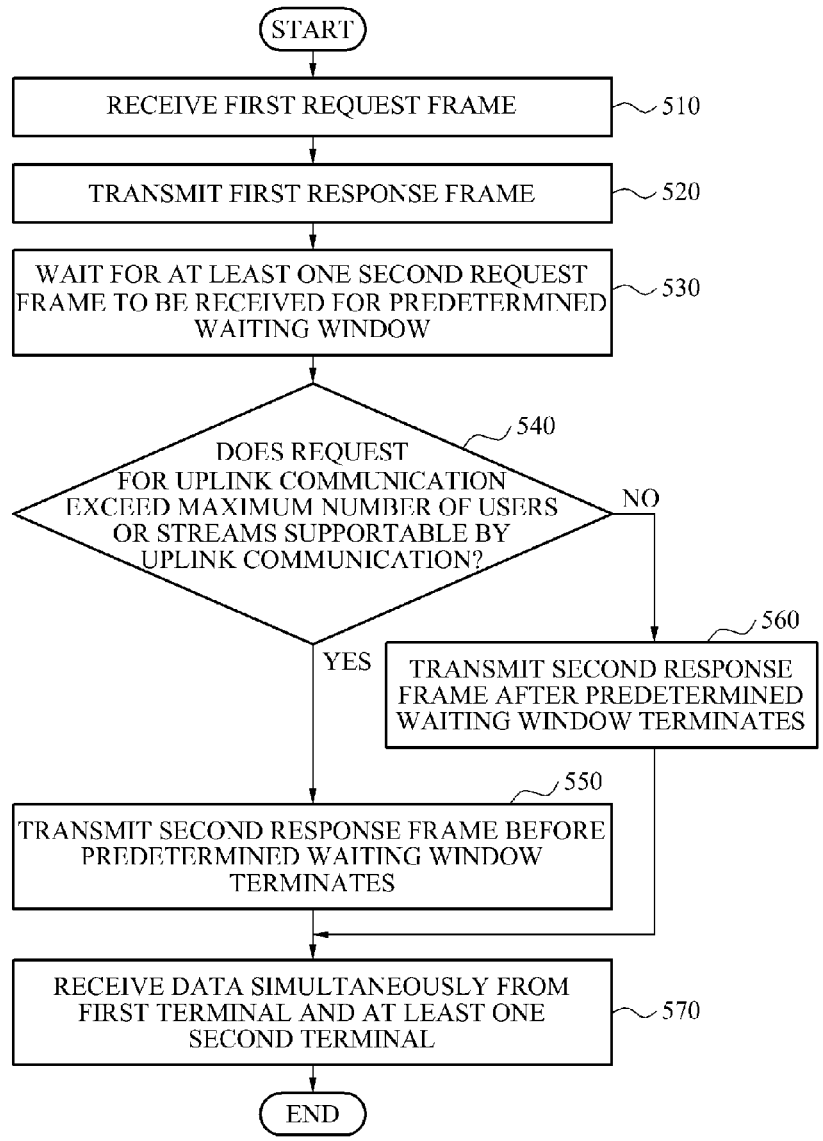
FIG. 5 is a flowchart illustrating another example of a communication method of an access point.

FIG. 5 illustrates another example of a communication method of an access point. FIG. 5 illustrates a communication method in which the access point receives at least one second request frame from at least one second terminal.

In 510, the access point receives a first request frame from a first terminal requesting uplink communication. For example, the first terminal may be a terminal initially accessing a channel and requesting the access point to transmit data through uplink communication.

The first request frame may include information about an amount of data to be transmitted by the first terminal to the access point through uplink communication, information about a size of a transmission of the data to be transmitted by the first terminal, and information about a number of streams included in the data.

The amount of data may correspond to an amount of total data to be transmitted to the access point by the first terminal, and the size of the transmission of the data may correspond to a length of a frame with respect to data to be transmitted to the access point by the first terminal.

In 520, the access point transmits a first response frame to the first terminal indicating whether the first request frame is received. For example, the first response frame may include information about a predetermined waiting window.

In 530, the access point waits for at least one second request frame indicating an uplink communication is requested from at least one second terminal during a predetermined waiting window. In the example of FIG. 5, the access point receives a request for uplink communication from at least one second terminal.

The access point may wait during a predetermined period of time such as a waiting window, to receive a request for an additional uplink transmission from other terminals. The access point may improve throughput by processing a request for data transmission from the first terminal along with a request for data transmission of other terminals when data transmission is requested using a corresponding channel.

The access point may adjust a length of a predetermined waiting window. A scheme of adjusting the length of a predetermined waiting window by the access point may include the following examples. For example, the access point may adjust a length of a waiting window through communication between the access point and terminals during an association of the terminals, or may adjust a length of a waiting window according to information about past history recorded during an access to terminals.

In 540, the access point determines whether the request for uplink communication received from the first terminal and the at least one second terminal exceeds a maximum number of users or streams supportable by uplink communication.

In 550, if the request for uplink communication exceeds a maximum number of users or streams supportable by uplink communication as a result of the determination in 540, the access point transmits a second response frame to the first terminal and the at least one second terminal before a predetermined waiting window terminates. In this example, the access point may transmit the second response frame to the first terminal and the at least one second terminal based on the at least one second request frame.

In contrast, if the request for uplink communication does not exceed a maximum number of users or streams supportable by uplink communication as a result of the determination in 540, the access point transmits a second response frame including information about assigning a resource with respect to the first terminal and the at least one second terminal based on the at least one second request frame, in 560.

In this example, the second response frame may include information for synchronizing data transmission through the uplink, information about an amount of data that is to be transmitted through the uplink, information about a size of a transmission size that is to be transmitted through the uplink, and/or information about a power back-off of at least one of the first terminal and the at least one second terminal.

In 570, in response to a reception of the at least one second request frame during a waiting window, the access point receives data simultaneously from the first terminal and the at least one second terminal.

As another example, if the at least one second request frame is not received during a predetermined waiting window, in 530, the access point may receive data only from the first terminal.

Figure 6:
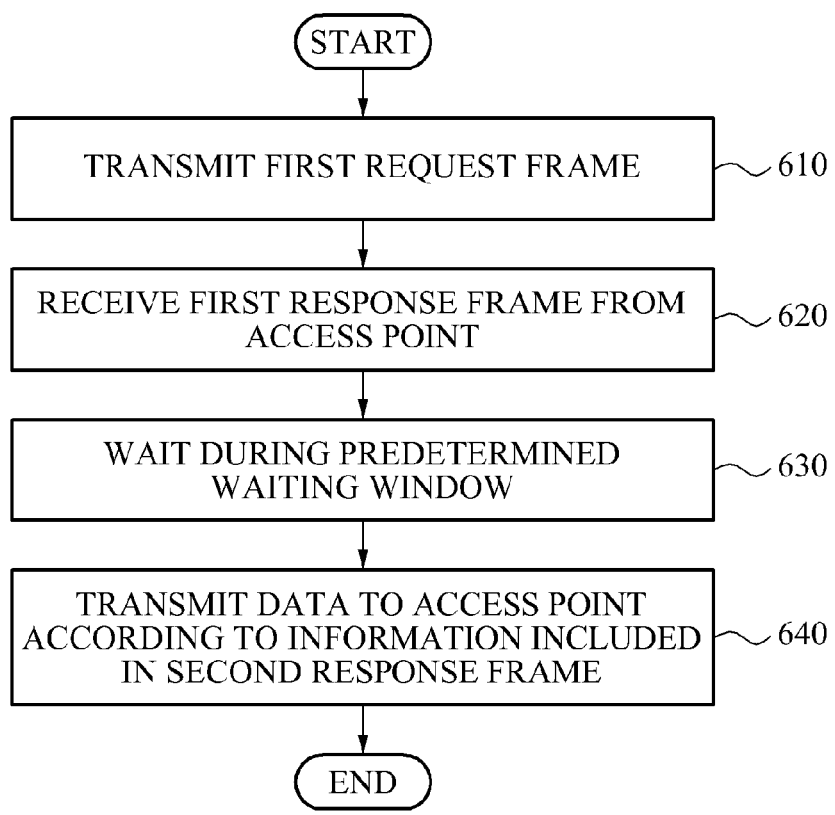
FIG. 6 is a flowchart illustrating an example of a communication method of a first terminal.

FIG. 6 illustrates an example of a communication method of a first terminal.

In 610, the first terminal transmits a first request frame, requesting uplink communication, to an access point. For example, the first request frame may include information about an amount of data to be transmitted by the first terminal, information about a transmission size of the data to be transmitted by the first terminal, and information about a number of streams included in the data.

In 620, the first terminal receives a first response frame indicating whether the first request frame is received, from the access point.

In 630, the first terminal waits during a predetermined waiting window based on information included in the first response frame.

In 635, the first terminal receives a second response from the access point. The second response frame may include information synchronizing a time at which data is to be transmitted through the uplink, information about an amount of data that is to be transmitted through the uplink, information about a size of a transmission size that is to be transmitted through the uplink, and/or information about a power back-off of at least one of the first terminal and the at least one second terminal.

In 640, the first terminal transmits data to the access point based on the information included in a second response frame transmitted from the access point.

For example, the first terminal may adjust the size of the transmission that is to be transmitted through the uplink and the power back-off according to information included in the second response frame. The first terminal may synchronize with the at least one second terminal based on the synchronization information with respect to data to be transmitted through the uplink included in the second response frame and may transmit data the access point.

In this example, the second response frame may be transmitted from the access point in response to the at least one request frame transmitted by the at least one second terminal during the predetermined waiting window. The second response frame may be transmitted to the access point to indicate whether the at least one second terminal requests uplink communication.

Figure 7:
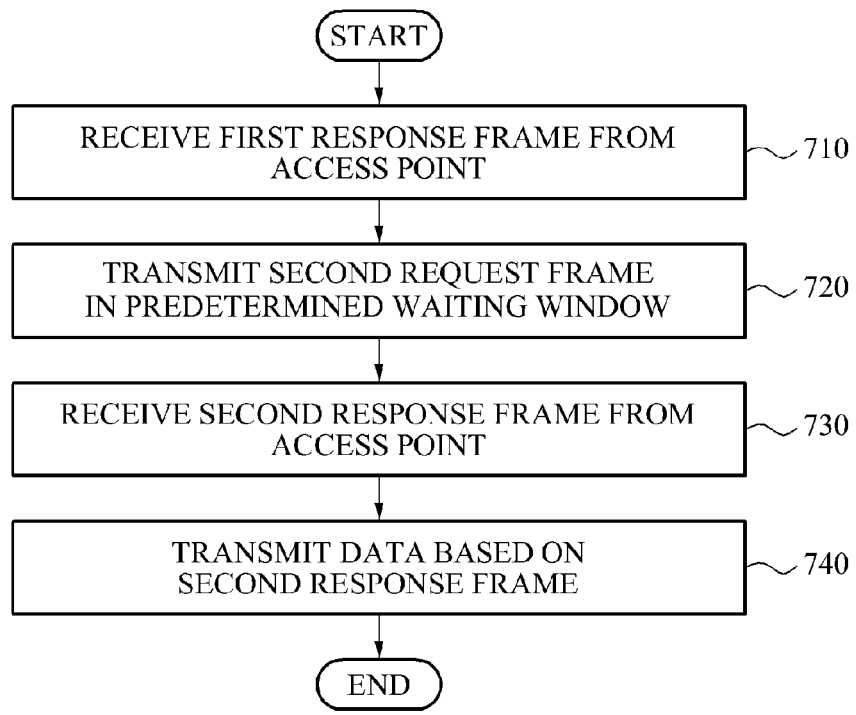
FIG. 7 is a flowchart illustrating an example of a communication method of a second terminal.

FIG. 7 illustrates an example of a communication method of a second terminal In 710, the second terminal receives a first response frame from an access point. In this example, the first response frame may correspond to a response with respect to a first request frame received from a first terminal requesting uplink communication.

In 720, the second terminal transmits a second request frame indicating whether uplink communication is requested by the second terminal in a predetermined waiting window indicated by information included in the first response frame.

In 730, the second terminal receives, from the access point, a second response frame including information about assigning a resource for the second terminal in uplink communication in response to the second request frame.

The second response frame may include information about an amount of data that is to be transmitted through the uplink, information about a size of a transmission size that is to be transmitted through the uplink, or information about a power back-off of at least one of the first terminal and the at least one second terminal.

In 740, the second terminal transmits data to the access point based on the information included in the second response frame.

The second terminal may transmit data to the access point in synchronization with the first terminal according to information for time synchronization with respect to data transmitted through the uplink, included in the second response frame.

Figure 8:
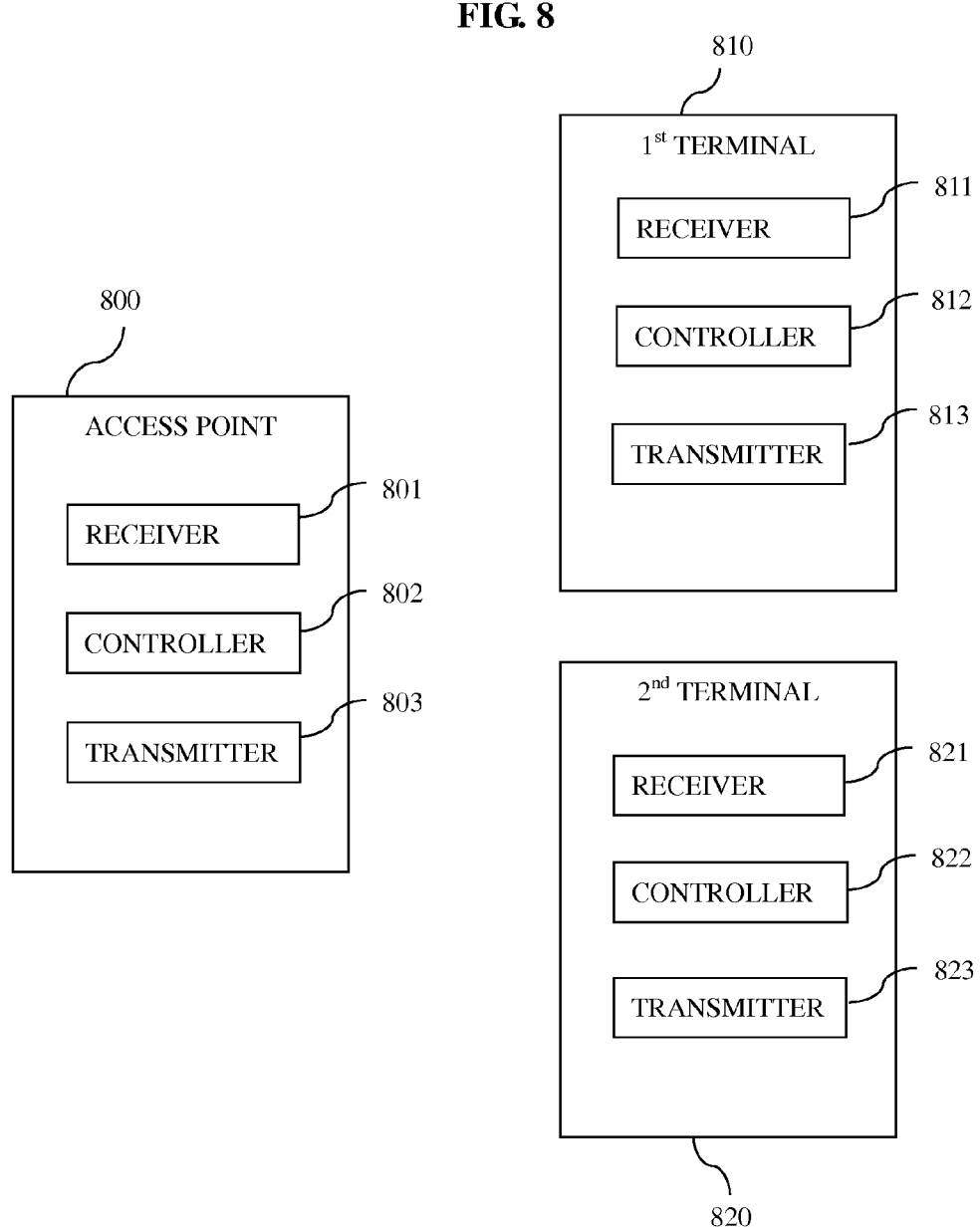
FIG. 8 is a diagram illustrating an example of an access point and a plurality of terminals.

FIG. 8 illustrates an example of an access point and a plurality of terminals.

Referring to FIG. 8, access point 800 communicates with first terminal 810 and second terminal 820. The access point 800 includes a receiver 801, a controller 802, and a transmitter 803. The first terminal 810 includes a receiver 811, a controller 812, and a transmitter 813. The second terminal 820 includes a receiver 821, a controller 822, and a transmitter 823. In this example, there are two terminals, however, it should be appreciated that the access point 800 may communicate and perform the above examples with more than two terminals.

The transmitter 802 of the access point 800 may transmit data to the receiver 811 of the first terminal 810 and to the receiver 821 of the second terminal 820. The transmitter 813 of the first terminal 810 may transmit data to the receiver 801 of the access point 800. The transmitter 823 of the second terminal 820 may transmit data to the receiver 801 of the access point 800.

The access point 800 may receive a first request frame from the first terminal 810 requesting uplink communication. For example, the first terminal 810 may be a terminal initially accessing a channel and requesting the access point 800 to transmit data through uplink communication. For example, the first request frame may include information about an amount of data to be transmitted by the first terminal 810 to the access point 800 through uplink communication, information about a size of a transmission of the data to be transmitted by the first terminal 810, and information about a number of streams included in the data.

The access point 800 may transmit a first response frame to the first terminal 810 indicating whether the first request frame is received. For example, the first response frame may include information about a predetermined waiting window.

The access point 800 may wait for at least one second request frame indicating an uplink communication is requested from the second terminal 820 during a predetermined waiting window.

The access point 800 may wait during a predetermined period of time such as a waiting window, to receive a request for an additional uplink transmission from other terminals such as second terminal 820. The access point 800 may improve throughput by processing a request for data transmission from the first terminal 810 along with a request for data transmission from the second terminal 820.

After receiving the second request frame, the access point 800 may transmit a second response frame including information about assigning a resource with respect to the first terminal 810 and the second terminal 820.

For example, the second response frame may include information for synchronizing data transmission of the first terminal 810 and the second terminal 820 through the uplink, information about an amount of data that is to be transmitted through the uplink, information about a size of a transmission size that is to be transmitted through the uplink, and/or information about a power back-off of at least one of the first terminal 810 and the second terminal 820. Accordingly, the access point 800 may receive data simultaneously from the first terminal 810 and the second terminal 820.

It should be appreciated that the examples described with reference to FIGS. 1-7 are also applicable to the access point 800, the first terminal 810, and the second terminal 820 described in the example of FIG. 8.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of an access point, the method comprising:

receiving a first request frame from a first terminal requesting an uplink communication;

transmitting a first response frame to the first terminal indicating whether the first request frame is received and including information of a length of a predetermined waiting window;

waiting for a second request frame to be received from a second terminal during the predetermined waiting window in response to transmitting the first response frame to the first terminal, the second request frame indicating a request for uplink communication from the second terminal;

transmitting a second response frame including information about assigning a resource to at least one of the first terminal and the second terminal;

permitting uplink communication of the first terminal and the second terminal in response to the second request frame being received from the second terminal; and permitting uplink communication of the first terminal and not permitting uplink communication of the second terminal in response to the second request frame not being received from the second terminal during the predetermined waiting window, wherein the second response frame includes information for synchronizing a transmission time of the first terminal and the second terminal through the uplink, information about an amount of data that is to be transmitted through the uplink, information about a size of a transmission that is to be transmitted through the uplink, or information about a power back-off of at least one of the first terminal and the second terminal.

2. The method of claim 1, wherein the permitting further comprises:
permitting simultaneous uplink communication of the first terminal and the second terminal when the second request frame is received during the predetermined waiting window.

3. The method of claim 1, wherein the first request frame includes information about an amount of data to be transmitted by the first terminal, information about a size of a transmission of the data to be transmitted by the first terminal, and information about a number of streams included in the data.

4. The method of claim 1, wherein the first response frame includes information about the predetermined waiting window.

5. The method of claim 1, further comprising:
transmitting the second response frame after the predetermined waiting window terminates; and
receiving data from at least one of the first terminal and the second terminal based on the assigned resource.

6. The method of claim 1, further comprising:
determining whether the request for uplink communication received from the first terminal and the second terminal exceeds a maximum number of users or streams supportable by uplink communication; and
transmitting the second response frame to the first terminal and the second terminal before the predetermined waiting window terminates, based on a determination result.

7. The method of claim 1, further comprising:
adjusting a length of the predetermined waiting window.

8. A communication method of a terminal, the method comprising:
transmitting a first request frame to an access point to request uplink communication;

receiving a first response frame from the access point indicating whether the first request frame is received and including information of a length of a predetermined waiting window;

waiting the length of the predetermined waiting window in response to receiving the first response frame;

receiving a second response frame from the access point; and transmitting data to the access point based on information included in the second response frame transmitted from the access point, wherein the second response frame includes information for synchronizing a transmission time of data to be transmitted by the terminal and the other terminal through the uplink, information about an amount of data that is to be transmitted through the uplink, information about a size of a transmission that is to be transmitted through the uplink, and/or information about a power back-off of at least one of the terminal and the other terminal.

9. The method of claim 8, wherein the first response frame includes information about an amount of data to be transmitted by the terminal, information about a transmission size of the data to be transmitted by the terminal, and information about a number of streams included in the data.

10. The method of claim 8, wherein the second response frame includes information about assigning a resource with respect to the terminal and one other terminal depending on whether the access point receives one second request frame, indicating whether uplink communication is requested from the other terminal during the predetermined waiting window.

11. A communication method of a second terminal to transmit data to an access point after the access point has received a first request to uplink data from a first terminal, the method comprising:
receiving a first response frame, from the access point, in response to the first request frame being received by the access point from the first terminal requesting uplink communication, wherein the first response frame includes information of a length of a predetermined waiting window;

transmitting a second request frame indicating whether uplink communication is requested by the second terminal during the predetermined waiting window indicated by information included in the first response frame;

receiving, from the access point, a second response frame including information about assigning a resource for the second terminal in uplink communication; and transmitting data to the access point based on the second response frame, wherein the second response frame includes information for synchronizing a transmission time of the first terminal and the second terminal through the uplink, information about an amount of data that is to be transmitted through the uplink, information about a size of a transmission that is to be transmitted through the uplink, and/or information about a power back-off of at least one of the first terminal and the second terminal.

12. The method of claim 11, wherein the second response frame includes information about assigning a resource with respect to at least one of the first terminal and the second terminal.

13. A computer-readable storage medium having stored therein program instructions to cause a processor to execute a communication method of an access point, the method comprising:
receiving a first request frame from a first terminal requesting an uplink communication;

transmitting a first response frame to the first terminal indicating whether the first request frame is received and including information of a length of a predetermined waiting window;

waiting for a second request frame to be received from a second terminal during the predetermined waiting window in response to transmitting the first response frame to the first terminal, the second request frame indicating a request for uplink communication from the second terminal;

transmitting a second response frame including information about assigning a resource to at least one of the first terminal and the second terminal;

permitting uplink communication of the first terminal and the second terminal when the second request frame is received from the second terminal; and permitting uplink communication of the first terminal and not permitting uplink communication of the second terminal when the second request frame is not received from the second terminal during the predetermined waiting window, wherein the second response frame includes information for synchronizing a transmission time of the first terminal and the second terminal through the uplink, information about an amount of data that is to be transmitted through the uplink, information about a size of a transmission that is to be transmitted through the uplink, or information about a power back-off of at least one of the first terminal and the second terminal.

14. A terminal, comprising:
a transmitter configured to transmit a request to an access point to request to uplink data to the access point;
a receiver configured to receive a first response from the access point indicating whether the request is received and including information of a length of a predetermined waiting window that the terminal is to wait to uplink the uplink data and configured to receive a second response indicating a second terminal that is to uplink data from the access point; and
a controller configured to synchronize an uplink time of the terminal with an uplink time of the second terminal based on information comprising power back-off included in the second response,
wherein the transmitter is configured to transmit the uplink data at the synchronized uplink time,
wherein the second response includes information for synchronizing a transmission time of data to be transmitted by the terminal and the second terminal through the uplink, information about an amount of data that is to be transmitted through the uplink, information about a size of a transmission that is to be transmitted through the uplink, and/or information about a power back-off of at least one of the terminal and the second terminal.

15. The terminal of claim 14, wherein
the transmitter is configured to transmit a first request to uplink data to the access point.

16. The terminal of claim 14, wherein
the receiver is configured to receive a first response frame from the access point indicating receipt of a first request to uplink data from the second terminal and the predetermined waiting period,
the transmitter is configured to transmit a second request frame requesting to uplink data to the access point,
the receiver is configured to receive a second response frame in response to the second request frame, and
the controller is configured to synchronize the uplink time of the terminal with the uplink time of the second terminal based on information included in the second response.

17. The method of claim 7, wherein the length of the predetermined waiting window is adjusted according to information about past history of terminal activity.

\* \* \* \* \*